United States Patent [19]

Nakamura

[11] Patent Number: 4,486,305
[45] Date of Patent: Dec. 4, 1984

[54] SLURRY FEEDING DEVICE FOR USE IN FILTER PRESS

[75] Inventor: Masayuki Nakamura, Osaka, Japan

[73] Assignee: Kurita Machinery Manufacturing Company Limited, Osaka, Japan

[21] Appl. No.: 528,983

[22] Filed: Sep. 2, 1983

[30] Foreign Application Priority Data

Sep. 20, 1982 [JP] Japan ................................ 57-164511
Oct. 26, 1982 [JP] Japan ................................ 57-188635

[51] Int. Cl.³ ............................................. B01D 25/12
[52] U.S. Cl. ................................... 210/227; 100/196; 210/230
[58] Field of Search ............... 210/224, 225, 226, 227, 210/228, 229, 230, 231; 100/196, 197, 198

[56] References Cited

U.S. PATENT DOCUMENTS 3,957,645  5/1976  Kurita et al. ........................ 210/231
4,052,314 10/1977  Busse et al. ...................... 210/231 X
4,219,425  8/1980  Yoshida ........................... 210/228 X

FOREIGN PATENT DOCUMENTS 1461498  3/1968  Fed. Rep. of Germany ...... 210/231

Primary Examiner—Richard V. Fisher
Assistant Examiner—W. Gary Jones
Attorney, Agent, or Firm—Wenderoth, Lind & Ponack

[57] ABSTRACT OF THE DISCLOSURE

A slurry feeding device for use in a filter press including at least one pair of first and second filter plates formed with first and second slurry holes, respectively, and a pair of first and second filter cloths interposed between the first and second filter plates. The device includes a pair of first and second plate members formed with first and second through-holes, respectively, and a plurality of first and second fastening members by which the first and second filter cloths are, respectively, secured to the first and second plate members.

15 Claims, 22 Drawing Figures

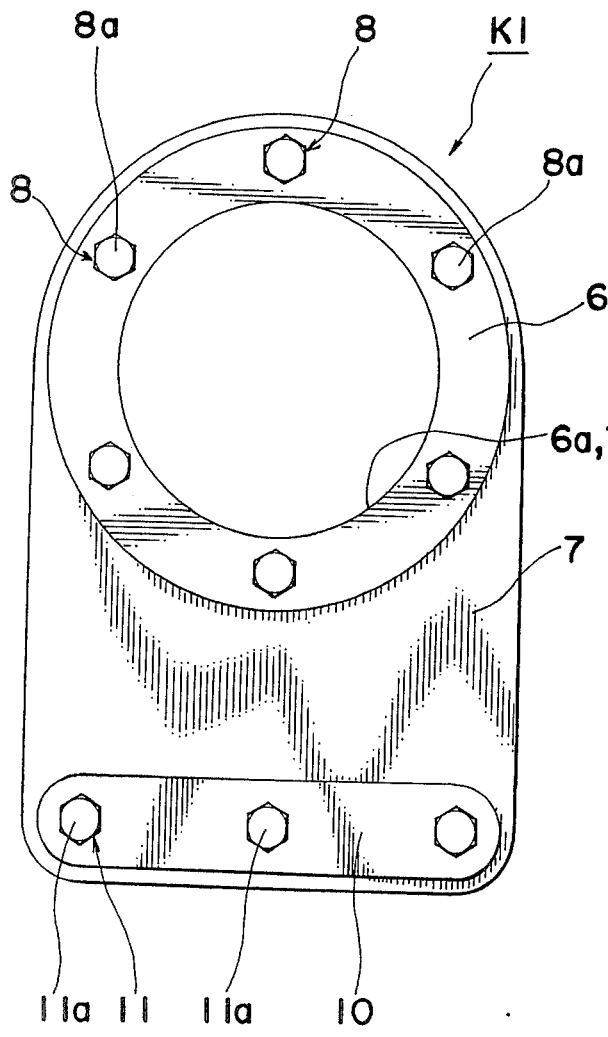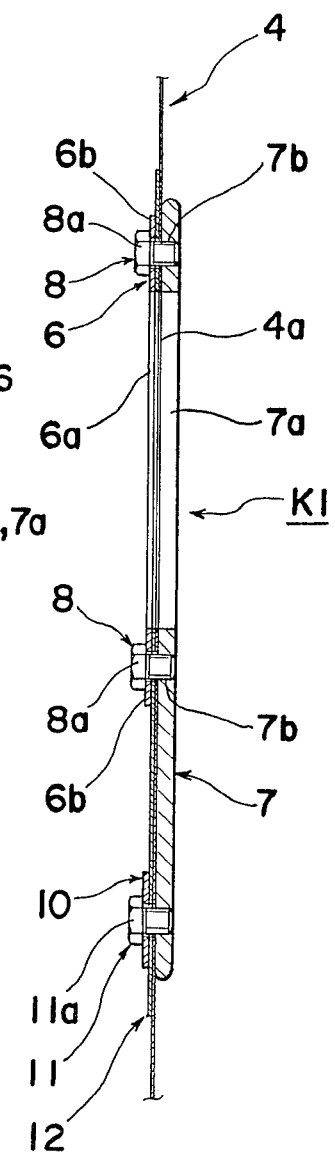

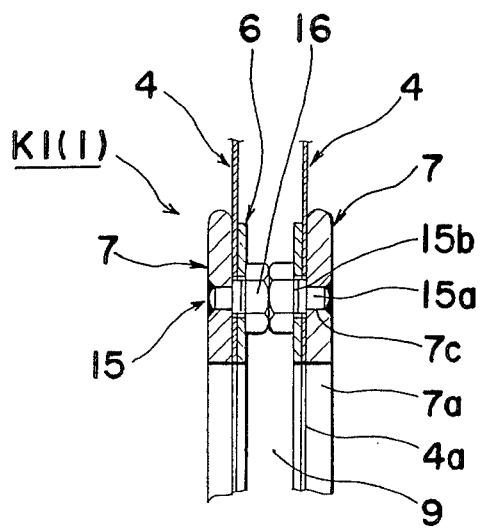
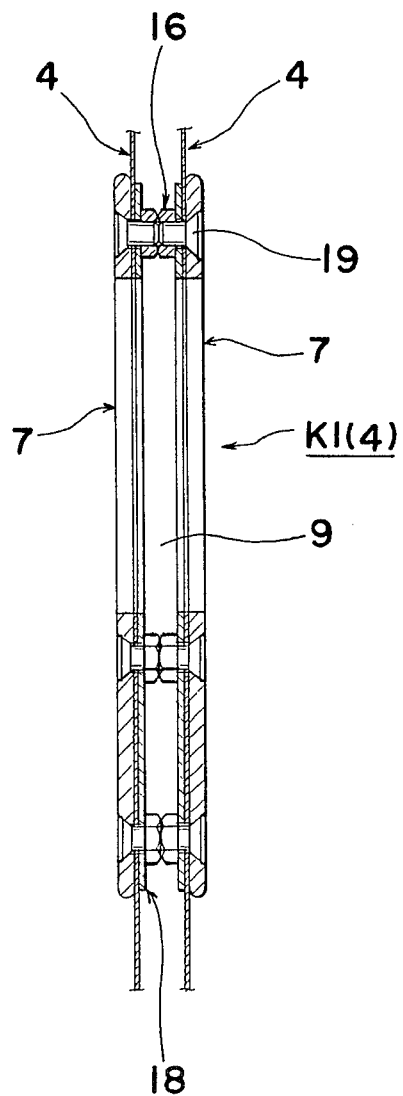
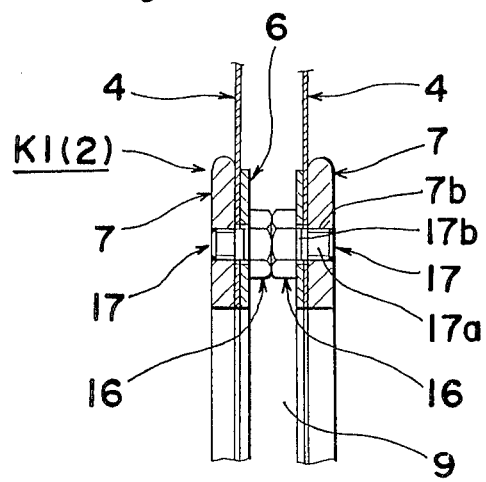

Fig. 7
Fig. 8
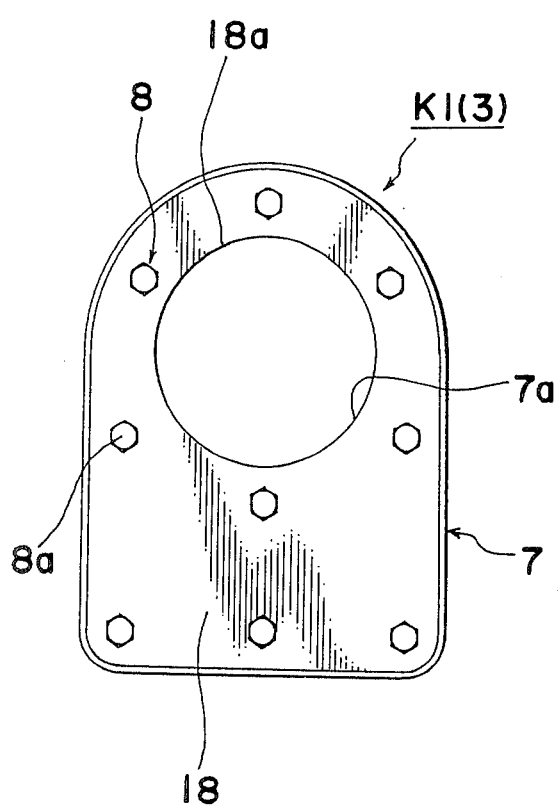
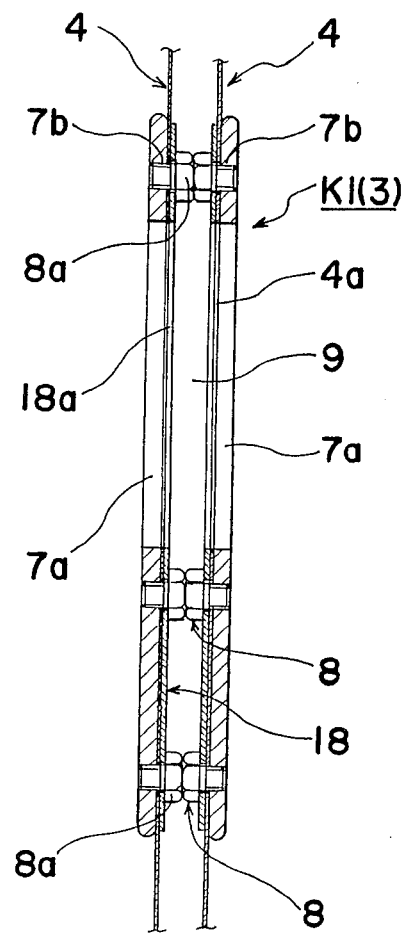

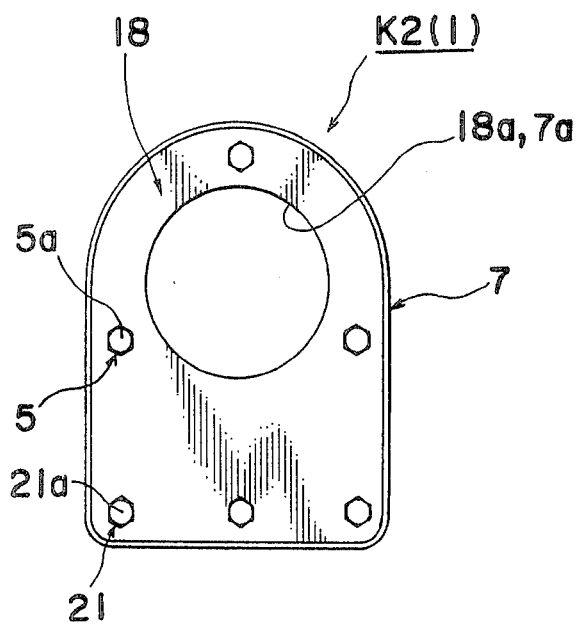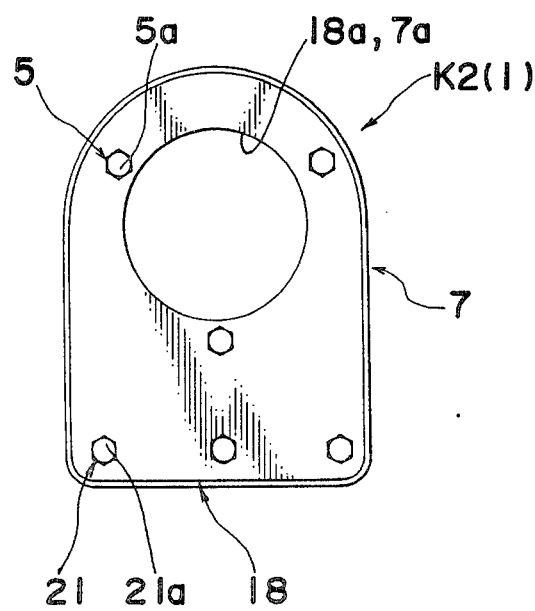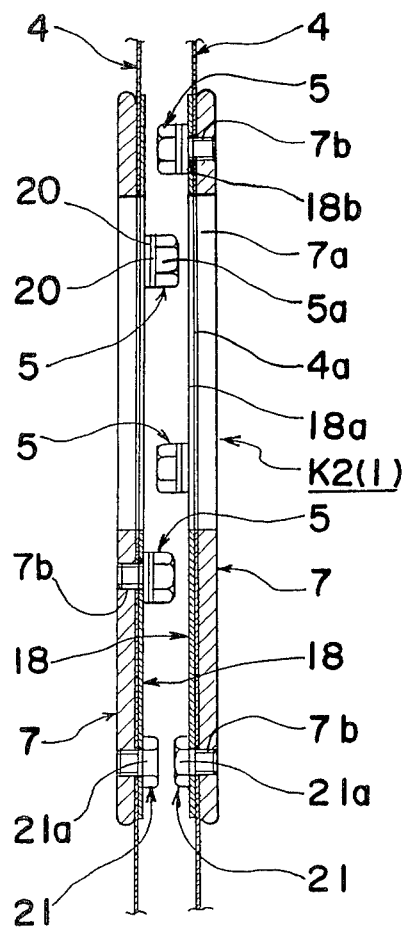

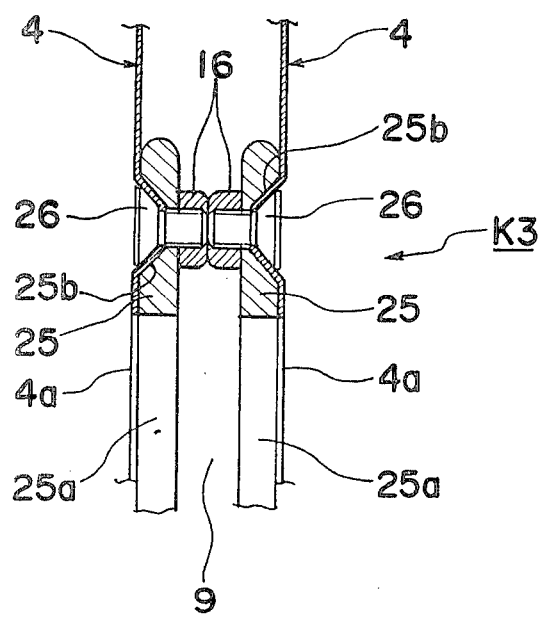
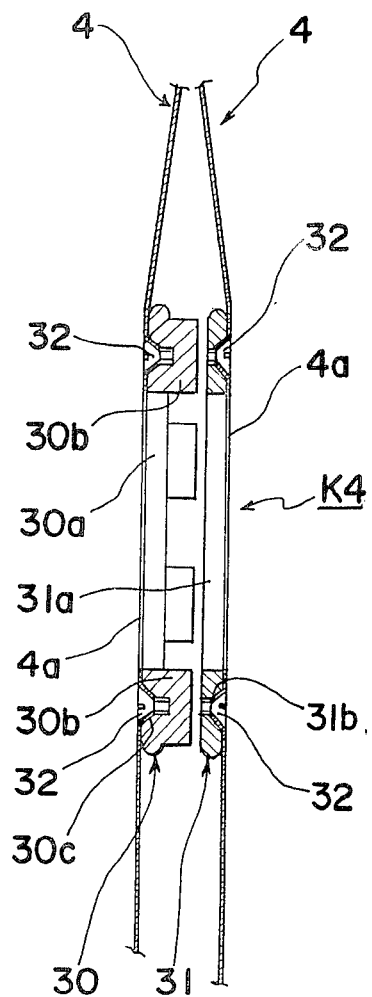

SLURRY FEEDING DEVICE FOR USE IN FILTER PRESS

BACKGROUND OF THE INVENTION

The present invention generally relates to a filter cloth travelling type filter press including a plurality of filter plates each formed with a slurry hole and a plurality of filter cloths interposed in pairs between adjacent ones of the filter plates, in which the filter cloths are caused to travel upwardly and downwardly with respect to the filter plates and more particularly, to a slurry feeding device for use in the filter cloth travelling type filter press, by which slurry to be filtered is fed from either one of the slurry holes of a pair of the adjacent filter plates into a filter chamber formed between a pair of the filter cloths, with the filter plates being clamped to each other.

Conventionally, in filter presses of the above described type, it has been so arranged that filter cloths are interposed in pairs between adjacent filter plates and a slurry feeding plate is disposed between each pair of the filter cloths. The slurry feeding plate of one-piece construction is formed with a through-hole communicated with a slurry feed opening in each of the filter cloths and is, further, provided with a feed passage extending downwardly from the through-hole and having an open lower end. Thus, after the adjacent filter plates are clamped to each other so as to secure the slurry feeding plate between each pair of the adjacent filter plates, slurry to be filtered is fed from either one of the slurry holes of a pair of the adjacent filter plates into the filter chamber formed by a pair of the filter cloths therebetween through a corresponding either one of the slurry feed openings of each pair of the filter cloths, the through-hole of the slurry feeding plate and the feed passage of the slurry feeding plate.

However, the prior art slurry feeding plate has a drawback that, since it is structurally difficult to wash the slurry feeding plate, especially the feed passage, slurry remains in the through-hole and the feed passage even after washing thereof, thereby resulting in clogging of the feed passage. Furthermore, the known slurry feeding plate has a drawback that, since the slurry feeding plate is of one-piece construction, it is difficult to clean the clogged feed passage. Moreover, the known slurry feeding plate has been disadvantageous in that, since the slurry feeding plate is of one-piece construction, the filter cloths attached to opposite sides of the slurry feeding plate are likely to be wrinkled, and assembly and replacement of the slurry feeding plate is extremely troublesome.

SUMMARY OF THE INVENTION

Accordingly, an essential object of the present invention is to provide an improved slurry feeding device for use in a filter press, by which slurry to be filtered can be smoothly fed into a filter chamber formed between each pair of filter cloths.

Another important object of the present invention is to provide an improved slurry feeding device of the above described type which can be easily repaired and washed.

Still another object of the present invention is to provide an improved slurry feeding device of the above described type which is simple in structure, highly reliable in actual use, suitable for mass production at low cost, and can be readily incorporated into filter presses and the like at low cost.

In accomplishing these and other objects according to one preferred embodiment of the present invention, there is provided an improved slurry feeding device for use in a filter press including at least one pair of first and second filter plates formed with first and second slurry holes, respectively and a pair of first and second filter cloths interposed between said first and second filter plates, with said first and second slurry holes confronting each other, said first and second filter cloths being, respectively, formed with first and second slurry feed openings and defining a filter chamber therebetween when said first and second filter plates are clamped to each other, said slurry feeding device being arranged to feed slurry from either one of said first and second slurry holes into said filter chamber, and comprising: a pair of first and second plate members which are, respectively, formed with first and second through-holes and are disposed between said first and second filter cloths; and a plurality of first and second fastening members by which said first and second filter cloths are, respectively, secured to said first and second plate members such that said first and second slurry feed openings are, respectively, communicated with said first and second through-holes, with said first and second filter cloths being, respectively, interposed between said first filter plate and said first plate member and between said second filter plate and said second plate member; said first and second through-holes, when said first and second filter plates are clamped to each other, confronting each other so as to be, respectively, communicated with said first and second slurry holes through said first and second slurry feed openings; said first and second plate members, when said first and second filter plates are clamped to each other, being spaced from each other in the axial direction of said first and second slurry holes so as to form a clearance between a first face plate member remote from said first filter cloth and a second face of said second plate member remote from said second filter cloth such that said first and second through-holes are brought into communication with said filter chamber, with said first face and said second face confronting each other, whereby the slurry is fed from either one of said first and second slurry holes into said filter chamber through corresponding either one of said first and second slurry feed openings and corresponding either one of said first and second through-holes.

In accordance with the present invention, when the first and second filter plates are retracted from each other after a pressing step of the filter press, the first and second plate members can be separated from each other, so that slurry remaining between the first and second plate members can be easily washed away and thus, clogging of the clearance between the first and second plate members can be positively prevented, whereby slurry to be filtered can be fed into the filter chamber smoothly.

BRIEF DESCRIPTION OF THE DRAWINGS

These and other objects and features of the present invention will become apparent from the following description of the preferred embodiments thereof together with the accompanying drawings, in which;

FIG. 3 is a front elevational view of the slurry feeding device of FIG. 1, with the filter cloth of the filter press being omitted for the sake of clarity, FIG. 4 is a longitudinal sectional view of the slurry feeding device of FIG. 1, which is attached to the filter cloth, FIGS. 5 and 6 are views similar to one portion of FIG. 2, particularly showing first and second modifications thereof, respectively, FIG. 7 is a view similar to FIG. 3, particularly showing a third modification thereof, FIG. 8 is a longitudinal sectional view of a slurry feeding device of FIG. 7, FIG. 9 is a view similar to FIG. 8, particularly showing a fourth modification of the slurry feeding device of FIG. 1, FIGS. 14 and 15 are views similar to FIGS. 10 and 11, respectively, particularly showing a first modification thereof, FIG. 16 is a longitudinal sectional view of a slurry feeding device of FIGS. 14 and 15, FIGS. 17 and 18 are views similar to FIGS. 10 and 11, respectively, particularly showing a second modification thereof, FIG. 21 is a fragmentary sectional view of a slurry feeding device according to a third embodiment of the present invention, and FIG. 22 is a longitudinal sectional view of a slurry feeding device according to a fourth embodiment of the present invention.

Before the description of the present invention proceeds, it is to be noted that like parts are designated by like reference numerals throughout several views of the accompanying drawings.

DETAILED DESCRIPTION OF THE INVENTION

Figure 1:
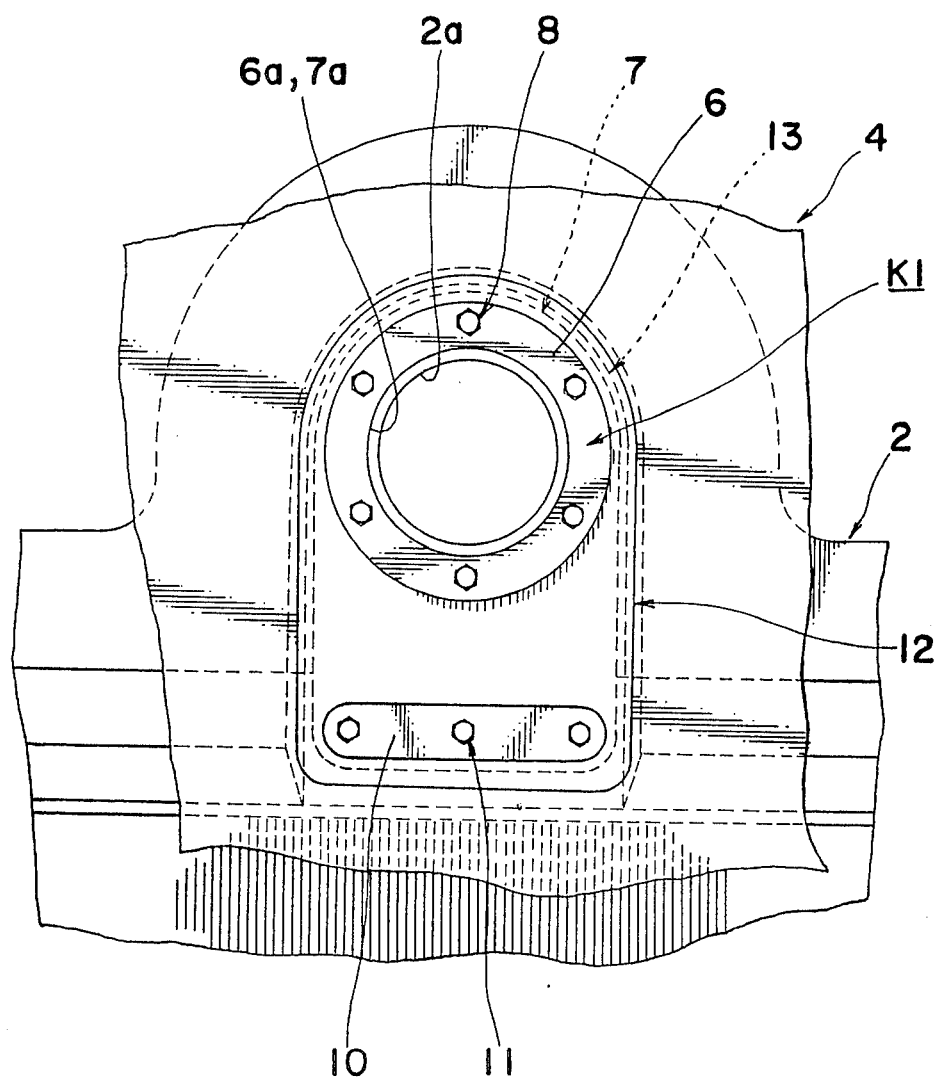
FIG. 1 is a fragmentary front elevational view of filter plates of a filter press provided with a slurry feeding device according to a first embodiment of the present invention.
Figure 2:
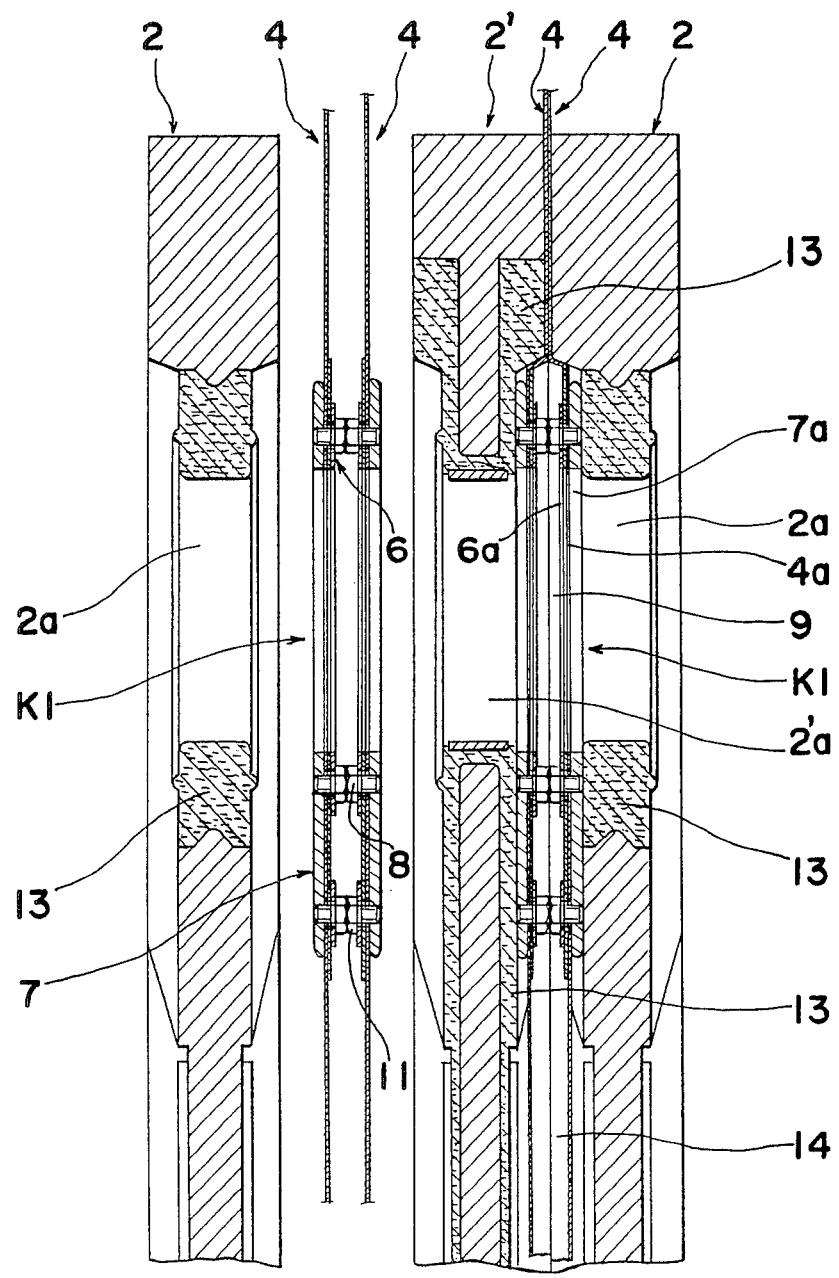
FIG. 2 is a fragmentary longitudinal sectional view of the filter plates of FIG. 1, two of which are spaced from each other, having the slurry feeding device of FIG. 1 interposed therebetween.
Figure 10:
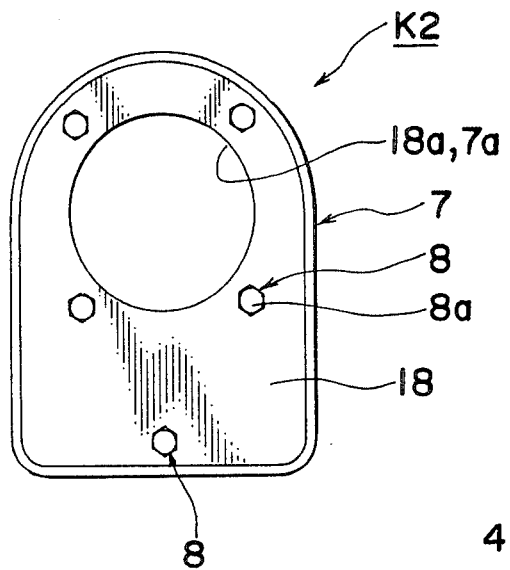
FIG. 10 is a front elevational view of one of a pair of washer plates and a corresponding one of a pair of retainer plates employed in a slurry feeding device according to a second embodiment of the present invention.
Figure 11:
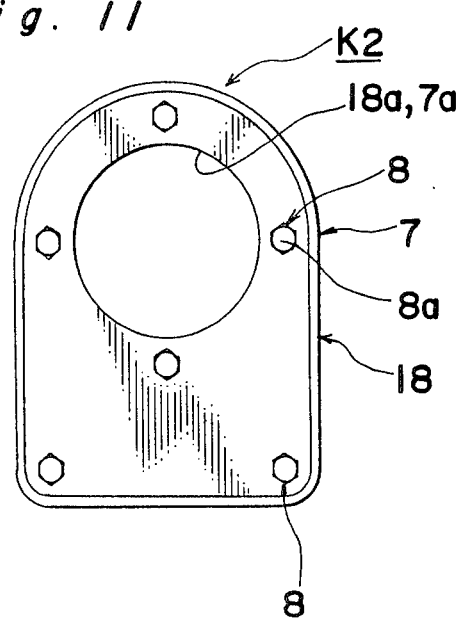
FIG. 11 is a front elevational view of the other one of the pair of washer plates and the other one of the pair of the retainer plates of the slurry feeding device of FIG. 10.
Figure 12:
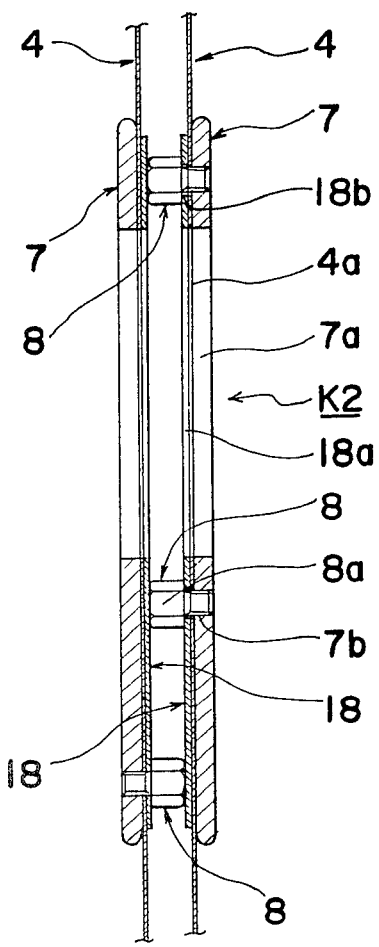
FIG. 12 is a longitudinal sectional view of the slurry feeding device of FIGS. 10 and 11.
Figure 13:
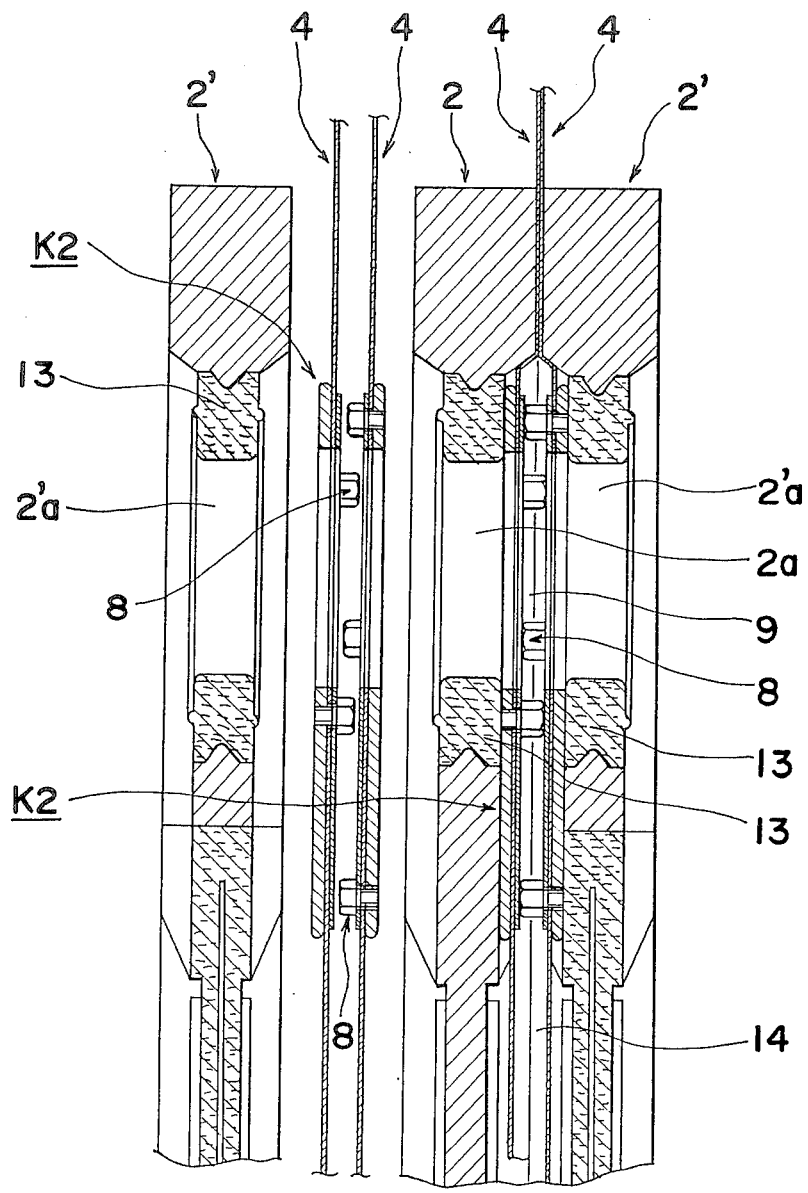
FIG. 13 is a view similar to FIG. 2, particularly showing the filter plates having the slurry feeding device of FIG. 12 interposed therebetween.
Figure 17:
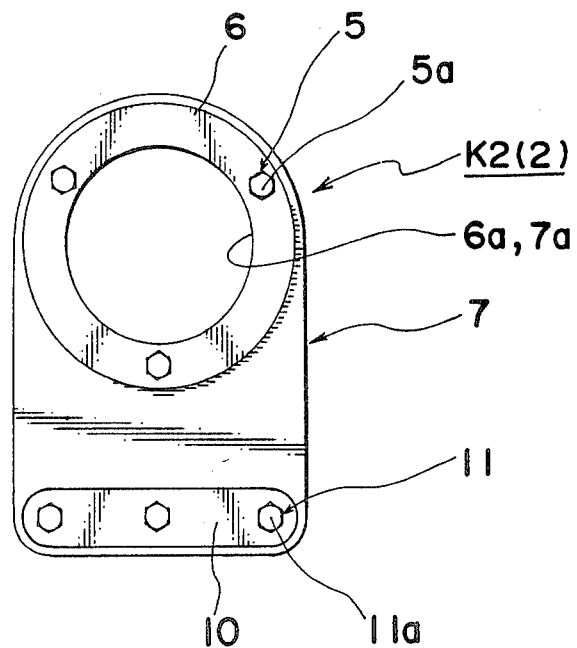
Figure 18:
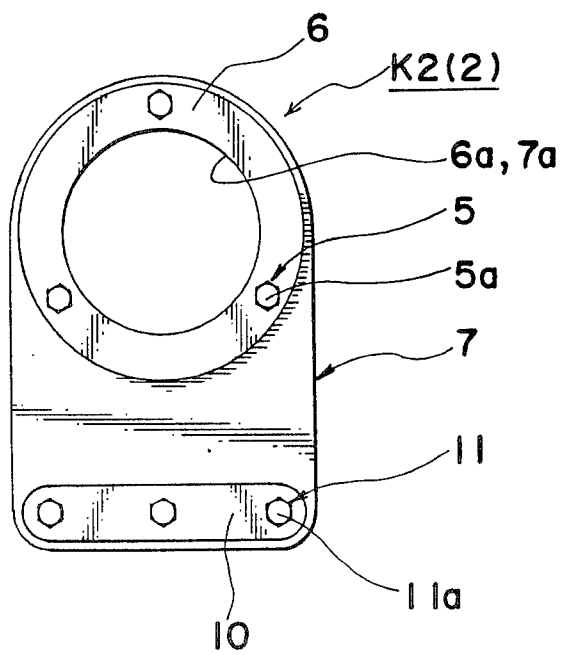
Figure 19:
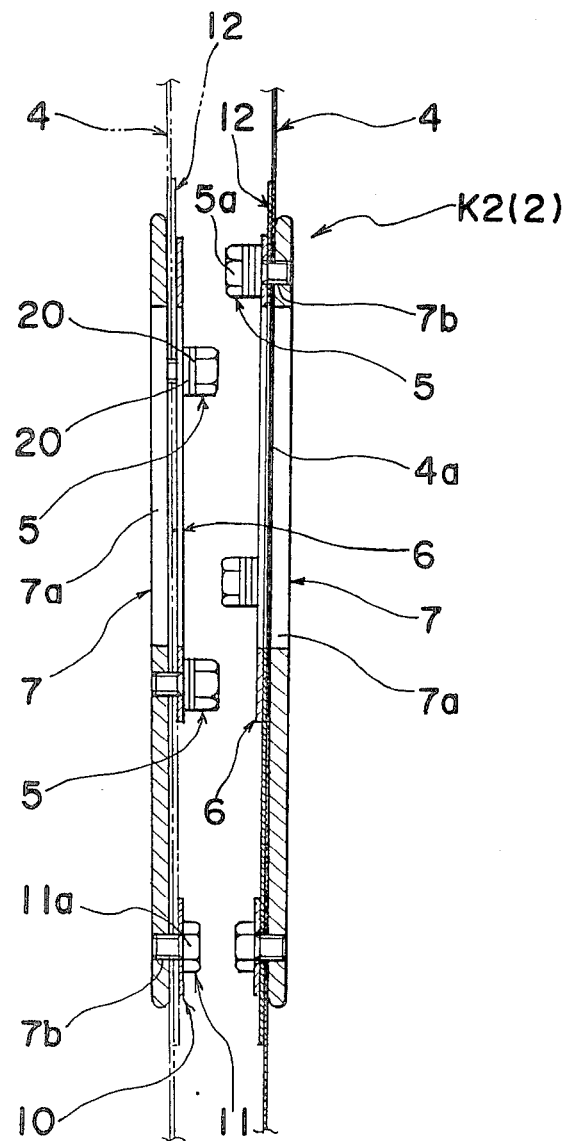
FIG. 19 is a longitudinal sectional view of a slurry feeding device of FIGS. 17 and 18, ·
Figure 20:
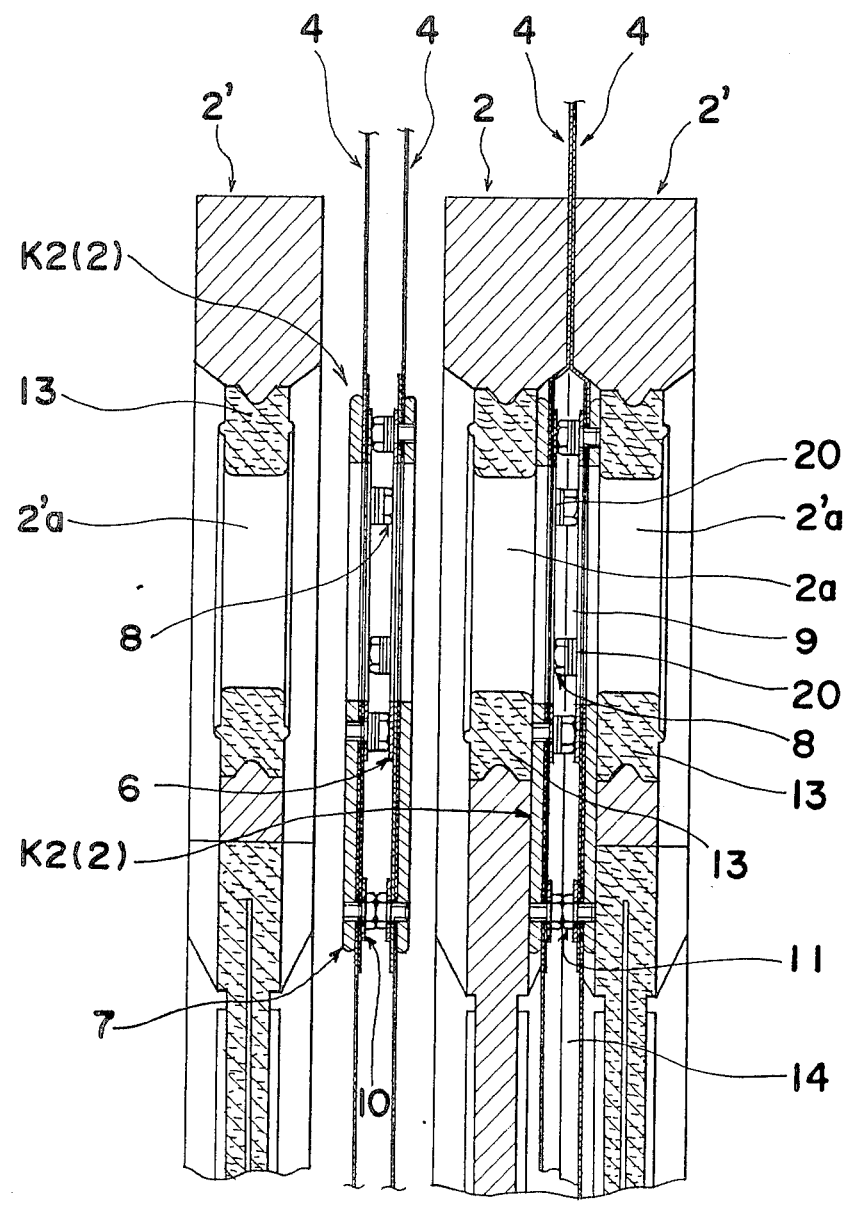
FIG. 20 is a view similar to FIG. 2, particularly showing the filter plates having the slurry feeding device of FIG. 19 interposed therebetween.

Referring now to the drawings, there is shown in FIGS. 1 and 2, a filter press in which a slurry feeding device K1 according to a first embodiment of the present invention is incorporated. The filter press includes a plurality of ordinary filter plates 2 and pressing filter plates 2' (only the upper parts of which are shown) arranged alternately and a plurality of filter cloths 4 interposed in pairs between adjacent ones of the ordinary filter plates 2 and the pressing filter plates 2'. Means, (not shown) is provided for, at the time of retraction of the adjacent ones of the ordinary filter plates 2 and the pressing filter plates 2' away from each other, causing each pair of the filter cloths 4 interposed between one of the ordinary filter plates 2 and an adjacent one of the pressing filter plates 2' and supported, at their upper end, by a support rod (not shown) to travel upwardly and downwardly with respect to the ordinary filter plates 2 and the pressing filter plates 2' and means (not shown) for, at the time of a pressing step of the filter press, feeding slurry to be filtered between each pair of the filter cloths 4 from either one of a slurry hole 2a of the ordinary filter plate 2 and a slurry hole 2'a of the pressing filter plate 2' through the slurry feeding device K1, with the ordinary filter plates 2 and the pressing filter plates 2' being clamped to each other.

As shown in FIGS. 3 and 4, the slurry feeding device K1 generally includes a pair of plate members, here shown as annular washer plates 6, a pair of retainer plates 7 and a plurality of bolts 8 with each of the filter cloths 4 being secured between one of the washer plates 6 and a corresponding one of the retainer plates 7 by the use of the bolts 8. The washer plate 6 has a circular through-hole 6a formed at a central portion thereof in communication with a circular slurry feed opening 4a in the filter cloth 4 and includes a plurality of bolt holes 6b formed around the circumference of the through-hole 6a. The retainer plate 7 is an elongated plate member having a semicircular upper portion. The retainer plate 7 has a circular through-opening 7a, at the upper portion and in communication with the slurry feed opening 4a of the filter cloth 4 and further has a plurality of threaded holes 7b formed around the circumference of the through-opening 7a in alignment with the bolt holes 6b. A washer plate 6 is brought into contact with each of opposed faces of a pair of the filter cloths 4 interposed between the adjacent ordinary filter plate 2 and pressing filter plate 2' so as to enclose the slurry feed opening 4a. Then, the filter cloth 4 is interposed between the washer plate 6 and the retainer plate 7 and the bolts 8 are screwed into the threaded holes 7b of the retainer plate 7 from the side of the washer plate 6, so that the washer plate 6 and the retainer plate 7 are secured to the filter cloth 4 and, at the same time, head portions 8a of the bolts 8 projecting out of opposite faces of a pair of the washer plates 6 are brought into contact with each other when the ordinary filter plate 2 and the pressing filter plate 2' are clamped to each other, whereby a clearance 9 of a predetermined dimension is defined between the pair of the washer plates 6. Furthermore, a cover plate 10 is secured, through the filter cloth 4, to a lower portion of the retainer plate 7 by bolts 11 so as to prevent the filter cloth 4 from slackening. The head portions 11a of the bolts 11 secured to the pair of the cover plates 10 confront each other so as to be brought into contact with each other, so that the clearance 9 defined through contact of the opposite head portions 8a of the bolts 8 with each other is extended downwardly through contact of the head portions 11a of the bolts 11 with each other, whereby slurry to be filtered can be smoothly fed between the adjacent ordinary filter plate 2 and pressing filter plate 2'. Furthermore, an auxiliary filter cloth 12 is provided between the washer plate 6 and the filter cloth 4 so as to reinforce the filter cloth 4.

The cover plate 10 can have projections extending outwardly beyond the head portion 11a of the bolt 11 in a widthwise direction of the cover plate 10 such that the projections formed on a pair of the cover plates 10 are brought into contact with each other. Moreover, washers can be employed in place of the cover plate 10.

The slurry feeding device K1 arranged as described above functions as follows. As shown in the right-hand portion of FIG. 2, where the adjacent ordinary filter plate 2 and pressing filter plate 2' are clamped to each other, each of the retainer plates 7 is pressed against packing members 13 defining each of the slurry hole 2a of the ordinary filter plate 2 and the slurry hole 2'a of the pressing filter plate 2' so as to be brought into close contact therewith, so that the clearance 9 is defined between the pair of the washer plates 6 through contact of the opposite head portions 8a of the bolts 8 with each other and through contact of the opposite head portions 11a of the bolts 11 with each other. Thereafter, slurry to be filtered is fed from either the slurry hole 2a of the ordinary filter plate 2 or the slurry hole 2'a of the pressing filter plate 2' into the corresponding one of the through-holes 6a of the washer plates 6 through the corresponding one of the through-openings 7a of the retainer plates 7 and corresponding one of the slurry feed openings 4a of the filter cloths 4 such that a portion of the slurry is fed, for filtration, from the clearance 9 formed between the pair of the washer plates 6 into a filter chamber 14 formed between the pair of the filter cloths 4, with the remaining portion of the slurry being fed from the clearance 9 into the other slurry hole 2a of the ordinary filter plate 2 or the slurry hole 2'a of the pressing filter plate 2' through the other one of the through-holes 6a of the washer plates 6, the other one of the slurry feed openings 4a of the filter cloths 4 and the other one of the through-openings 7a of the retainer plates 7.

On the other hand, as shown in the left-hand portion of FIG. 2, in the case where the adjacent ordinary filter plate 2 and pressing filter plate 2' are retracted from each other, the support rod for the filter cloth 4 is caused to move downwardly and, at the same time, the pair of the filter cloths 4 are wound for washing thereof. For example, in the case where the pair of the filter cloths 4 are wound downwardly of the ordinary filter plate 2 and the pressing filter plate 2' by separate winding rollers in opposite directions, the clearance between the pair of the filter cloths 4 is increased, so that the pair of the washer plates 6 pressed against each other through the head portions 8a of the bolts 8 and the head portions 11a of the bolts 11 are separated from each other and thus, the opposite faces of the pair of the washer plates 6 washed easily and positively, whereby such an undesirable phenomenon can be that slurry remains in the clearance 9 between the pair of the washer plates 6 with the result that the clearance 9 is clogged by the slurry can be positively prevented. Furthermore, since the bolts 8 and 11 are provided symmetrically with respect to a longitudinal central axis of the retainer plate 7, a uniform force is applied to the slurry feeding device K1 so that it is not subjected to an overload.

Although the ordinary filter plate 2 and the pressing filter plate 2' have the slurry holes 2a and 2'a, respectively, disposed outwardly of filtration areas thereof in the above described embodiment, the structure can be so modified that the ordinary filter plate 2 and the pressing filter plate 2' have the slurry holes 2a and 2'a disposed inside the filtration areas, respectively.

Referring now to FIG. 5, there is shown a slurry feeding device K1 (1) which is a first modification of the slurry feeding device K1. In the first modified slurry feeding device K1 (1), a fastening screw 15 having, at one end thereof, a small diameter rod portion 15a and, at the other end thereof, a threaded portion 15b is employed in place of the bolt 8. The rod portion 15a is tightly fitted into a hole 7c of the retainer plate 7 and welded, at its end, to the retainer plate 7 and the threaded portion 15b projecting out of the washer plate 6 through the filter plate 4 is provided with a nut 16. The nuts 16 fastened to the opposite fastening screws 15 are brought into contact with each other such that the clearance 9 is defined between the pair of the washer plates 6.

Referring to FIG. 6, there is shown a slurry feeding device K1 (2) which is a second modification of the slurry feeding device K1. In the second modified slurry feeding device K1 (2), a stud bolt 17 having, at one end thereof, a threaded portion 17a and, at the other end thereof, a threaded portion 17b is employed in place of the bolt 8. The threaded portion 17a is screwed into the threaded hole 7b of the retainer plate 7 and the threaded portion 17b is fastened by the nut 16 through the filter cloth 4 and the washer plate 6. The nuts 16 fastened to the opposite stud bolts 17 are brought into contact with each other such that the clearance 9 is defined between the pair of the washer plates 6.

Referring to FIGS. 7 and 8, there is shown a slurry feeding device K1 (3) which is a third modification of the slurry feeding device K1. In the third modified slurry feeding device K1 (3), a plate 18 provided with a through-hole 18a and slightly smaller, in shape, than the retainer plate 7 is employed in place of the washer plate 6 and the cover plate 10 and thus, the number of the components of the slurry feeding device has been reduced. As shown in FIG. 9, the third modified slurry feeding device K1 (3) can be further modified to a fourth modified slurry feeding device K1 (4) in which a countersunk screw 19 and the nut 16 are employed in place of the bolt 8 and thus, the nuts 16 fastened to the opposite countersunk screws 19 are brought into contact with each other such that the clearance 9 is defined between the pair of the plates 18.

When the through-hole 6a of the washer plate 6 and the through-opening 7a of the retainer plate 7 are made smaller than the slurry feed opening 4a of the filter cloth 4, the periphery of the slurry feed opening 4a of the filter cloth 4 can be protected and flow control of the slurry can be performed.

Furthermore, the through-holes 6a of the washer plates 6 and the through-openings 7a of the retainer plates 7 can be made gradually smaller in a direction away from the end from which slurry to be filtered is fed so as to gradually restrict flow of the slurry.

Moreover, the washer plate 6 is not required to be of one-piece construction and therefore, can be divided in the circumferential direction thereof. Thus, the washer plate 6 can be replaced by a plurality of washers.

In addition, the washer plate 6 is not restricted, in shape, to a circular shape and may have any arbitrary shape such as an ellipse, etc. for securing the filter cloth 4. Likewise, the retainer plate 7 may be of any arbitrary shape for securing the filter cloth 4.

Referring now to FIGS. 10 to 13, there is shown a slurry feeding device K2 according to a second embodiment of the present invention. In the slurry feeding device K2, the bolts 8 secured to one of plate members, here shown as pair of the plates 18 are positioned out of alignment with the bolts 8 secured to the other one of the pair of the plates 18 such that the head portions 8a of the bolts 8 secured to the one of the pair of the plates 18 and the head portions 8a of the bolts 8 secured to the other one of the pair of the plates 18 are, respectively, brought into contact with the other of the pair of plates 18 and the one of the pair of plates 18 when the ordinary filter plate 2 and the pressing filter plate 2' are clamped to each other, whereby the clearance 9 is defined between the pair of the plates 18.

Referring to FIGS. 14 to 16, there is shown a slurry feeding device K2 (1) which is a first modification of the slurry feeding device K2. In the first modified slurry feeding device K2 (1), the bolts 8 disposed at the periphery of the through-hole 18a of the plate 18 are replaced by bolts 5 each having a head portion 5a and washers 20. Furthermore, in the first modified slurry feeding device K2 (1), the bolts 8 secured to the lower portion of the plate 18 are replaced by bolts 21 each having a head portion 21a. Since the bolts 5 secured to one of the pair of the plates 18 are positioned out of alignment with the bolts 5 secured to the other one of the pair of the plates 18, the head portions 5a of the bolts 5 secured to the one of the pair of the plates 18 and the head portions 5a of the bolts 5 secured to the other one of the pair of the plates 18 are, respectively, brought into contact with the other of the pair of plates 18 and the one of the pair of the plates 18 when the ordinary filter plate 2 and the pressing filter plate 2' are clamped to each other, whereby the clearance 9 is defined between the pair of the plates 18. Since the bolts 21 secured to the one of the pair of the plates 18 are provided in alignment with the bolts 21 secured to the other one of the pair of the plates 18, the head portions 21a of the bolts 21 secured to the one of the pair of the plates 18 and the head portions 21a of the bolts 21 secured to the other one of the pair of the plates 18 are brought into contact with each other when the ordinary filter plate 2 and the pressing filter plate 2' are clamped to each other, whereby the clearance 9 defined by contact of the opposite head portions 5a of the bolts 5 with each other is further extended to the lower portion of the plate 18. Furthermore, since the bolts 5 are provided with the washers 20, the clearance 9 defined between the pair of the plates 18 can be changed or can be maintained at a predetermined value even in the case where such undesirable phenomena as variations of thickness of the filter cloth 4, machining errors of the plates 18, etc. take place, by changing the number of the washers 20 or changing the thickness of the washers 20.

Referring to FIGS. 17 to 20, there is shown a slurry feeding device K2(2) which is a second modification of the slurry feeding device K2. In the second modified slurry feeding device K2(2), the first modified slurry feeding device K2(1) is so modified that the plate 18 is replaced by the annular washer plate 6 and the cover plate 10. Accordingly, in the second modified slurry feeding device K2(2), the bolts 5 secured to one of the pair of the washer plates 6 are out of alignment with the bolts 5 secured to the other one of the pair of the washer plates 6, so that the head portions 5a of the bolts 5 secured to the one of the pair of the washer plates 6 and the head portions 5a of the bolts 5 secured to the other one of the pair of the washer plates 6 are, respectively, brought into contact with the other of the pair of plates 6 and the one of the pair of the washer plates 6 when the ordinary filter plate 2 and the pressing filter plate 2' are clamped to each other, whereby the clearance 9 is defined between the pair of the washer plates 6. Meanwhile, since the bolts 11 secured to one of the pair of the cover plates 10 are provided in alignment with the bolts 11 secured to the other one of the pair of the cover plates 10, the head portions 11a of the bolts 11 secured to the one of the pair of the cover plates 10 and the head portions 11a of the bolts 11 secured to the other one of the pair of the cover plates 10 are brought into contact with each other when the ordinary filter plate 2 and the pressing filter plate 2' are clamped to each other. Since the plate 18 is replaced by the washer plate 6 and the cover plate 10 in the second modified slurry feeding device K2(2), the second modified slurry feeding device K2(2) is reduced in weight as compared with the slurry feeding device K2 and the first modified slurry feeding device K2(1), whereby the load applied to the filter cloth 4 can be reduced.

Since other parts of the slurry feeding devices K2, K2(1) and K2(2) are similar to those of the slurry feeding devices K1 and K1(1) to K1(4), a detailed description thereof is omitted for the sake of brevity.

Referring now to FIG. 21, there is shown a slurry feeding device K3 according to a third embodiment of the present invention. In the slurry feeding device K3, the fourth modified slurry feeding device K1(4) (FIG. 9) is further so modified that the plate 18 and the retainer plate 7 are replaced by a plate member in the form of a ring 25. More specifically, the slurry feeding device K3 generally includes a pair of rings 25, a plurality of flush bolts 26 and a plurality of the nuts 16. The ring 25 has a circular through-hole 25a formed at a central portion thereof and includes a plurality of countersunk holes 25b formed around the circumference of the through-hole 25a. The pair of the rings 25 are disposed between the pair of the filter cloths 4 which are interposed between the ordinary filter plate 2 and the pressing filter plate 2' such that the countersunk holes 25b of the pair of the rings 25 confront the corresponding filter cloths 4. Then, the flush bolts 26 are inserted into the countersunk holes 25b of each of the pair of the rings 25 through each of the pair of the filter cloths 4 so as to project out of each of the pair of the rings 25 into the clearance 9 such that each of the through-holes 25a of the rings 25 is brought into communication with each of the slurry feed openings 4a of the filter cloths 4, with the filter cloths 4 being caused to slightly sink into the countersunk holes 25b. Consequently, when the rings 25 are attached to the filter cloths 4, mounting portions of the filter cloths 4, adjacent to the countersunk holes 25b are desirably prevented from slackening. Subsequently, the nuts 16 are attached to the projecting portions of the flush bolts 26 between the pair of the rings 25. Since the flush bolts 26 secured to one of the pair of the rings 25 are provided in alignment with the flush bolts 26 secured to the other one of the pair of the rings 25, the nuts 16 of the flush bolts 26 secured to the one of the pair of the rings 25 and the nuts 16 of the flush bolts 26 secured to the other one of the pair of the rings 25 are brought into contact with each other when the ordinary filter plate 2 and the pressing filter plate 2' are clamped to each other, whereby the clearance 9 is defined between the pair of the rings 25. Since other parts of the slurry feeding device K3 are similar to those of the slurry feeding device K1, a detailed description thereof is omitted for the sake of brevity.

Referring now to FIG. 22, there is shown a slurry feeding device K4 according to a fourth embodiment of the present invention. The slurry feeding device K4 generally includes circular washer plates 30 and 31 and a plurality of countersunk screws 32. The washer plates 30 and 31 have through-holes 30a and 31a formed at central portions thereof, respectively. The washer plate 30 has a plurality of projections 30b formed around the circumference of the through-hole 30a such that the projections 30b confront the washer plate 31. The washer plate 30 further has a plurality of countersunk threaded holes 30c formed at positions of the projections 30b and in the one face thereof adjacent to the corresponding filter cloth 4. The washer plate 31 has a plurality of countersunk threaded holes 31b formed at corresponding positions to the countersunk threaded holes 30c of the washer plate 30 and opening from one face thereof adjacent to the corresponding filter cloth 4. Thus, the pair of the filter cloths 4 interposed between the ordinary filter plate 2 and the pressing filter plate 2' are attached to the washer plates 30 and 31 by screwing the countersunk screws 32 into the countersunk threaded holes 30c and 31b, respectively, such that the slurry feed openings 4a of the pair of the filter cloths 4 are brought into communication with the through-hole 30a of the washer plate 30 and the through-hole 31a of the washer plate 31, respectively, with the filter cloths 4 being caused to slightly sink into the countersunk threaded holes 30c and 31b, respectively. Accordingly, when the ordinary filter plate 2 and the pressing filter plate 2' are clamped to each other, the projections 30b of the washer plate 30 are brought into contact with the washer plate 31, whereby the clearance 9 is defined between the washer plates 30 and 31. The construction can be so modified that the washer plates 30 and 31 are divided in the circumferential directions thereof. Furthermore, the structure can be so modified that a plurality of first and second projections provided out of alignment with each other are, respectively, formed on the washer plates 30 and 31 such that the first and second projections are, respectively, brought into contact with the washer plates 31 and 30 when the ordinary filter plate 2 and the pressing filter plate 2' are clamped to each other, whereby the clearance 9 is defined between the washer plates 30 and 31. Moreover, the structure can be so modified that the projections 30b are provided separately from the washer plate 30 and are secured to the washer plate 30 by any suitable coupling means such as fusion, bonding, bolting, etc. Since other parts of the slurry feeding device K4 are similar to those of the slurry feeding device K1, a detailed description thereof is omitted for the sake of brevity.

It should be noted here that the slurry feeding devices K1 to K4 of the present invention are not exclusively applied to the filter presses having the ordinary filter plates 2 and the pressing filter plates 2' arranged alternately but also can be applied to filter presses provided with only the pressing filter plates 2' or filter presses provided with only the ordinary filter plates 2. Furthermore, in the above described embodiments, the pair of the filter cloths can be supported so as to straddle the filter plate, or the filter press can be of a type having a so-called panatagraph type suspension device mounted on the filter plate, from which the filter cloths are suspended. In addition, a washing device for the filter cloths can be inserted from outside of the filter plates in between the filter plates or be disposed below the filter plates such that a washing pipe of the washing device is moved, for washing, toward the filter cloths when the filter plates are retracted from each other.

As is clear from the foregoing description, in accordance with the present invention, since each pair of the washer plates are separated from each other when the filter plates are retracted from each other, the undesirable phenomenon that slurry remains in the clearance between the pair of the washer plates with the result that the clearance is clogged by the slurry can be prevented, whereby slurry to be filtered can be smoothly fed into the filter chamber and the pair of the filter cloths can be separated from each other by a large distance, resulting in easy repair or washing of the slurry feeding device.

Furthermore, in accordance with the present invention, since the structure of the slurry feeding device has been simplified, the slurry feeding device can be assembled easily.

In accordance with the present invention, since the washer plate and the retainer plate are secured to each other so as to have the filter cloth therebetween, the slurry hole of the filter plate, the through-opening of the retainer plate and the through-hole of the washer plate can be positively brought into communication with each other and the retainer plate can be reliably brought into close contact with the filter plate.

In addition, the conventional slurry feeding plates each having the feed passage formed have a large thickness and therefore, are heavy, thus subjecting the filter cloth to an overload. On the other hand, in accordance with the present invention, since the clearance is defined between the pair of the washer plates through contact of the projections of the opposite fastening members with each other, the washer plate and the retainer plate both attached to the filter cloth can be made smaller in thickness than the conventional slurry feeding plates and thus can be made lighter in weight than the conventional slurry feeding plates, so that an overload is not applied to the filter cloth.

Furthermore, in accordance with the present invention, since the feed passage is not subjected to directional restrictions, slurry to be filtered can be fed from the through-hole of the washer plate in any arbitrary direction extending at right angles to the axis of the through-hole of the washer plate, so that the rate for feeding the slurry into the filter chamber can be increased and thus the production efficiency of the filter press can be improved.

Moreover, the conventional slurry feeding plate has the feed passage formed therein and therefore, is required to be machined accurately. On the contrary, in accordance with the present invention, since the clearance is defined between the pair of the washer plates through contact of the opposite fastening members with each other, the production cost of the slurry feeding device can be reduced.

In addition, in accordance with the present invention, since the washer plate and the retainer plate are attached to each of the filter cloths, each of the filter cloths can be smoothly moved.

In accordance with the present invention, when the filter plates are clamped to each other, the projections formed on the washer plates are brought into contact with the other one of the washer plates, whereby the clearance is positively defined between the washer plates.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A slurry feeding device for use in a filter press having at least one pair of first and second filter plates with first and second slurry holes therein, respectively, and a pair of first and second filter cloths interposed between said first and second filter plates in only abutting relationship therewith, with said first and second slurry holes confronting each other, said first and second filter cloths having, respectively, first and second slurry feed openings and defining a filter chamber therebetween when said first and second filter plates are clamped to each other, said slurry feeding device being operable to feed slurry to be filtered from either one of said first and second slurry holes into said filter chamber, said slurry feeding device comprising:

a pair of first and second plate members which have, respectively, first and second through holes and for being positioned between the first and second filter cloths; and a plurality of first and second fastening members for securing said first and second filter cloths to said first and second plate members with the first and second slurry feed openings respectively communicated with the first and second through holes, when the first and second filter cloths are respectively interposed between the first filter plate and said first plate member and between the second filter plate and said second plate member, said fastening members projecting from the faces of said plate members which face away from the filter cloths for, when the first and second filter plates are clamped to each other, only abutting the opposite plate member and fastening member assembly for defining a clearance between the first face of said first plate member facing away from the first filter cloth and a second face of said second plate member facing away from the second filter cloth;

said first and second through holes, when the first and second filter plates are clamped to each other, confronting each other so as to be, respectively, communicated with the first and second slurry holes through the first and second slurry feed openings, and with said first and second through holes being in communication with said clearance and said clearance being in communication with the filter chamber, whereby the slurry can be fed from either the first or the second slurry holes into the filter chamber through either one of the first or second slurry feed openings and the corresponding one of said first and second through holes, and when the filter plates are separated, the filter cloths can be easily separated from each other by movement of the abutting fastening members away from each other.

2. A slurry feeding device as claimed in claim 1, wherein said first and second fastening members have first and second projecting portions which project away from said first and second faces into said clearance, respectively, said first and second projecting portions, when said first and second filter plates are clamped to each other, being brought into contact with each other so as to form said clearance between said first face and said second face.

3. A slurry feeding device as claimed in claim 2, further comprising a pair of first and second retainer plates which have first and second through-openings, respectively and are, respectively, secured to said first and second plate members through said first and second filter cloths by said first and second fastening members so as to be interposed between said first filter plate and said first filter cloth and between said second filter plate and said second filter cloth such that said first and second through-openings are, respectively, communicated with said first and second through-holes through said first and second slurry feed openings, said first and second through-openings, when said first and second filter plates are clamped to each other, being, respectively, communicated with said first slurry hole and said second slurry hole, whereby the slurry is fed from either one of said first and second slurry holes into said filter chamber through a corresponding one of said first and second through-openings, a corresponding one of said first and second slurry feed openings and a corresponding one of said first and second through-holes.

4. A slurry feeding device as claimed in claim 3, wherein said first and second fastening members are bolts each having a head portion as each of said first and second projecting portions.

5. A slurry feeding device as claimed in claim 4, further including washers by which said clearance between said first face of said first plate member and said second face of said second plate member can be adjusted.

6. A slurry feeding device as claimed in claim 3, wherein said first and second fastening members are bolts and nuts with the nuts as said first and second projecting portions.

7. A slurry feeding device as claimed in claim 6, further including washers by which said clearance between said first face of said first plate member and said second face of said second plate member can be adjusted.

8. A slurry feeding device as claimed in claim 1, wherein said first and second fastening members have first and second projecting portions which project away from said first and second faces into said clearance, respectively, said first and second projecting portions, when said first and second filter plates are clamped to each other, being, respectively, brought into contact with said second face and said first face so as to form said clearance between said first face and said second face.

9. A slurry feeding device as claimed in claim 8, further comprising a pair of first and second retainer plates which have first and second through-openings, respectively and are, respectively, secured to said first and second plate members through said first and second filter cloths by said first and second fastening members so as to be interposed between said first filter plate and said first filter cloth and between said second filter plate and said second filter cloth such that said first and second through-openings are, respectively, communicated with said first and second through-holes through said first and second slurry feed openings, said first and second through-openings, when said first and second filter plates are clamped to each other, being, respectively, communicated with said first slurry hole and said second slurry hole, whereby the slurry is fed from either one of said first and second slurry holes into said filter chamber through a corresponding one of said first and second through-openings, a corresponding one of said first and second slurry feed openings and a corresponding one of said first and second through-holes.

10. A slurry feeding device as claimed in claim 9, wherein said first and second fastening members are bolts each having a head portion as each of said first and second projecting portions.

11. A slurry feeding device as claimed in claim 10, further including washers by which said clearance between said first face of said first plate member and said second face of said second plate member can be adjusted.

12. A slurry feeding device as claimed in claim 9, wherein said first and second fastening members are bolts and nuts with the nuts as said first and second projecting portions.

13. A slurry feeding device as claimed in claim 12, further including washers by which said clearance between said first face of said first plate member and said second face of said second plate member can be adjusted.

14. A filter press having a slurry feeding device, the filter press having at least one pair of first and second filter plates with first and second slurry holes therein, respectively, and a pair of first and second filter cloths interposed between said first and second filter plates in only abutting relationship therewith, with said first and second slurry holes confronting each other, said first and second filter cloths having, respectively, first and second slurry feed openings and defining a filter chamber therebetween when said first and second filter plates are clamped to each other, said slurry feeding device being operable to feed slurry to be filtered from either one of said first and second slurry holes into said filter chamber:

said slurry feeding device having:
a pair of first and second plate members which have, respectively, first and second through holes and positioned between said first and second filter cloths; and
a plurality of first and second fastening members securing said first and second filter cloths to said first and second plate members with said first and second slurry feed openings respectively communicated with said first and second through holes, when said first and second filter cloths are respectively interposed between said first filter plate and said first plate member and between said second filter plate and said second plate member, said fastening members projecting from the faces of said plate members which face away from said filter cloths for, when said first and second filter plates are clamped to each other, only abutting the opposite plate member and fastening member assembly for defining a clearance between the first face of said first plate member facing away from said first filter cloth and a second face of said second plate member facing away from said second filter cloth;
said first and second through holes, when said first and second filter plates are clamped to each other, confronting each other so as to be, respectively, communicated with the first and second slurry holes through said first and second slurry feed openings, and with said first and second through holes being in communication with said clearance and said clearance being in communication with said filter chamber,
whereby the slurry can be fed from either said first or second slurry holes into said filter chamber through either one of said first or second slurry feed openings and the corresponding one of said first and second through holes, and when said filter plates are separated, said filter cloths can be easily separated from each other by movement of the abutting fastening members away from each other.

15. A slurry feeding device for use in a filter press having at least one pair of first and second filter plates with first and second slurry holes therein, respectively, and a pair of first and second filter cloths interposed between said first and second filter plates in only abutting relationship therewith, with said first and second slurry holes confronting each other, said first and second filter cloths having, respectively, first and second slurry feed openings and defining a filter chamber therebetween when said first and second filter plates are clamped to each other, said slurry feeding device being operable to feed slurry to be filtered from either one of said first and second slurry holes into said filter chamber, said slurry feeding device comprising:

a pair of first and second plate members which have, respectively, first and second through holes and for being positioned between the first and second filter cloths; and
a plurality of first and second fastening members for securing said first and second filter cloths to said first and second plate members with the first and second slurry feed openings respectively communicates with the first and second through holes, when the first and second filter cloths are respectively interposed between the first filter plate and said first plate member and between the second filter plate and said second plate member, projecting members projecting from the faces of said plate members which face away from the filter cloths for, when the first and second filter plates are clamped to each other, only abutting the opposite plate member and projecting member assembly for defining a clearance between the first face of said first plate member facing away from the first filter cloth and a second face of said second plate member facing away from the second filter cloth;
said first and second through holes, when the first and second filter plates are clamped to each other, confronting each other so as to be, respectively, communicated with the first and second slurry holes through the first and second slurry feed openings, and with said first and second through holes being in communication with said clearance and said clearance being in communication with the filter chamber,
whereby the slurry can be fed from either the first or the second slurry holes into the filter chamber through either one of the first or second slurry feed openings and the corresponding one of said first and second through holes, and when the filter plates are separated, the filter cloths can be easily separated from each other by movement of the abutting projecting members away from each other.

* * * * *